(12) United States Patent
Deshpande et al.

(10) Patent No.: US 10,769,035 B2
(45) Date of Patent: Sep. 8, 2020

(54) KEY-VALUE INDEX RECOVERY BY LOG FEED CACHING

(71) Applicant: INTERNATIONAL BUSINESS MACHINES CORPORATION, Armonk, NY (US)

(72) Inventors: Umesh Deshpande, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 15/581,779

(22) Filed: Apr. 28, 2017

(65) Prior Publication Data
US 2018/0314607 A1    Nov. 1, 2018

(51) Int. Cl.
*G06F 16/00*    (2019.01)
*G06F 11/14*    (2006.01)
*G06F 16/28*    (2019.01)

(52) U.S. Cl.
CPC ...... *G06F 11/1471* (2013.01); *G06F 11/1451* (2013.01); *G06F 11/1474* (2013.01); *G06F 16/28* (2019.01); *G06F 2201/84* (2013.01)

(58) Field of Classification Search
CPC .. G06F 11/1471; G06F 2201/84; G06F 16/28; G06F 11/1451; G06F 11/1474; G06F 11/2023; G06F 11/2097; G06F 11/2035; G06F 11/2033
See application file for complete search history.

(56) References Cited

U.S. PATENT DOCUMENTS

| | | | |
|---|---|---|---|
| 8,712,970 B1 * | 4/2014 | Sim-Tang | G06F 16/20 707/672 |
| 9,268,653 B2 | 2/2016 | Kimmel et al. | |
| 9,576,038 B1 * | 2/2017 | Huang | G06F 16/27 |
| 10,078,682 B2 * | 9/2018 | Tan | G06F 16/2228 |
| 2005/0187891 A1 * | 8/2005 | Johnson | G06F 11/202 |
| 2006/0156064 A1 * | 7/2006 | Damani | G06F 11/1471 714/16 |
| 2009/0150605 A1 * | 6/2009 | Flynn | G06F 3/0613 711/112 |
| 2014/0279931 A1 | 9/2014 | Gupta et al. | |
| 2015/0205680 A1 * | 7/2015 | Kimmel | G06F 12/0246 707/649 |
| 2017/0212680 A1 * | 7/2017 | Waghulde | G06F 16/185 |
| 2017/0364411 A1 * | 12/2017 | Fan | G06F 11/1448 |
| 2018/0011893 A1 * | 1/2018 | Kimura | G06F 12/0238 |
| 2018/0137014 A1 * | 5/2018 | Li | G06F 11/1458 |

(Continued)

OTHER PUBLICATIONS

Symantec, Veritas File System Administrator's Guide v. 5.1, Nov. 16, 2009, Symantec, p. 73 https://sort-static.veritas.com/public/documents/sf/5.1/linux/pdf/vxfs_admin.pdf.*

(Continued)

*Primary Examiner* — Leslie Wong
(74) *Attorney, Agent, or Firm* — Alex Harvey

(57) ABSTRACT

A computer system may include a storage device and nodes cooperating therewith to define a key value database architecture. A first node of the nodes may be configured to generate a plurality of checkpoints. The computer system may also include a second node of the nodes configured to operate a log feed cache manager based upon the checkpoints generated by the first node.

20 Claims, 8 Drawing Sheets

(56) References Cited

U.S. PATENT DOCUMENTS

2018/0210914 A1\* 7/2018 Huang .............. G06F 16/2379
2018/0300205 A1\* 10/2018 Sehgal .............. G06F 11/1469

OTHER PUBLICATIONS

Mao, Y. et al.; Cache Craftiness for Fast Multicore Key-Value Storage; Google; 2012.
Method and Apparatus for Implementing In-memory Database Logging System; IP.com; Oct. 15, 2010.
IBM; A System of Reducing Down Time in a Cached In-Memory Database Environment Using Checkpointing Mechanism; IP.com; Apr. 14, 2009.
Method and apparatus for maintaining and recording changed states of data between checkpointing/recovery events; IP.com; Jan. 24, 2014.
System and method to enable high speed recovery of RDBMS objects; IP.com; Apr. 13, 2016.
Ongaro, D. et al.;Fast crash recovery in RAMCloud; In Proceedings of the Twenty-Third ACM Symposium on Operating Systems Principles, pp. 29-41. ACM, 2011.
Kejriwal, A. et al; SLIK: Scalable Low-Latency Indexes for a Key-Value Store; USENIX Annual Technical Conference (ATC); Jun. 2016; Denver, CO.

\* cited by examiner

KEY-VALUE INDEX RECOVERY BY LOG FEED CACHING

BACKGROUND

The present invention relates to computer systems, and more specifically, to a key value database architecture and related methods.

A key value database is a database that stores data as a collection of key/value pairs. The key is used as a unique identifier of a particular record in the database.

Checkpointing is a technique to add fault tolerance into computing systems. During a checkpointing operation, a snapshot in time of the state of an application or of a storage device is captured. In the event of a failure, operation can be restored to the state at the last checkpointing operation.

SUMMARY

A computer system may include a storage device and a plurality of nodes cooperating therewith to define a key value database architecture and a first node of the plurality thereof configured to generate a plurality of checkpoints. The computer system may also include a second node of the plurality thereof configured to operate a log feed cache manager based upon the checkpoints generated by the first node.

The first node may be configured to write the plurality of checkpoints to the storage device. The first node may be configured to communicate a notification to the log feed cache manager based upon generation of the plurality of checkpoints, for example.

The log feed cache manager may be configured to read a log feed from the storage device, for example. The first node may be configured to communicate a log feed from the first node to the second node during generation of the plurality of checkpoints. The second node may be configured to validate the log feed based upon completion of generation of the plurality of checkpoints. The first node may be configured to communicate the log feed without writing the plurality of checkpoints to the storage device, for example.

The first node may be configured to communicate portions of a log feed from the first node to the second node based upon a current checkpoint and a previous checkpoint generated by the first node. The first node may be an active node, and the second node may be a spare node, for example. The first node may be a first active node, and the second node may be a second active node having spare capacity, for example.

The log feed cache manager may be configured to select a subset of shard log feeds for caching. The log feed cache manager may be configured to select the subset of shard log feeds based upon at least one of overhead, caching read performance, and a quality of service (QoS), for example.

A respective one of the first and second nodes may be configured, for one of load balancing and failover from the first node, where ownership of at least one shard is transferred, respectively, from the first node to the second node. The log feed cache manager may be configured to, for node affinity, cache shards from the storage device based upon at least one of a load across the first and second nodes, a quality of service (QoS), and a relation between shards. The log feed cache manager, may, during a recovery operation, be configured to replay a cached portion of a log feed and records added at a tail of the log feed after a latest checkpoint.

Another aspect is directed to a computer-implemented method for operating a computer system that includes a storage device and a plurality of nodes cooperating therewith to define a key value database architecture. The method may include using a first node of the plurality thereof to generate a plurality of checkpoints and using a second node of the plurality thereof to operate a log feed cache manager based upon the checkpoints generated by the first node.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
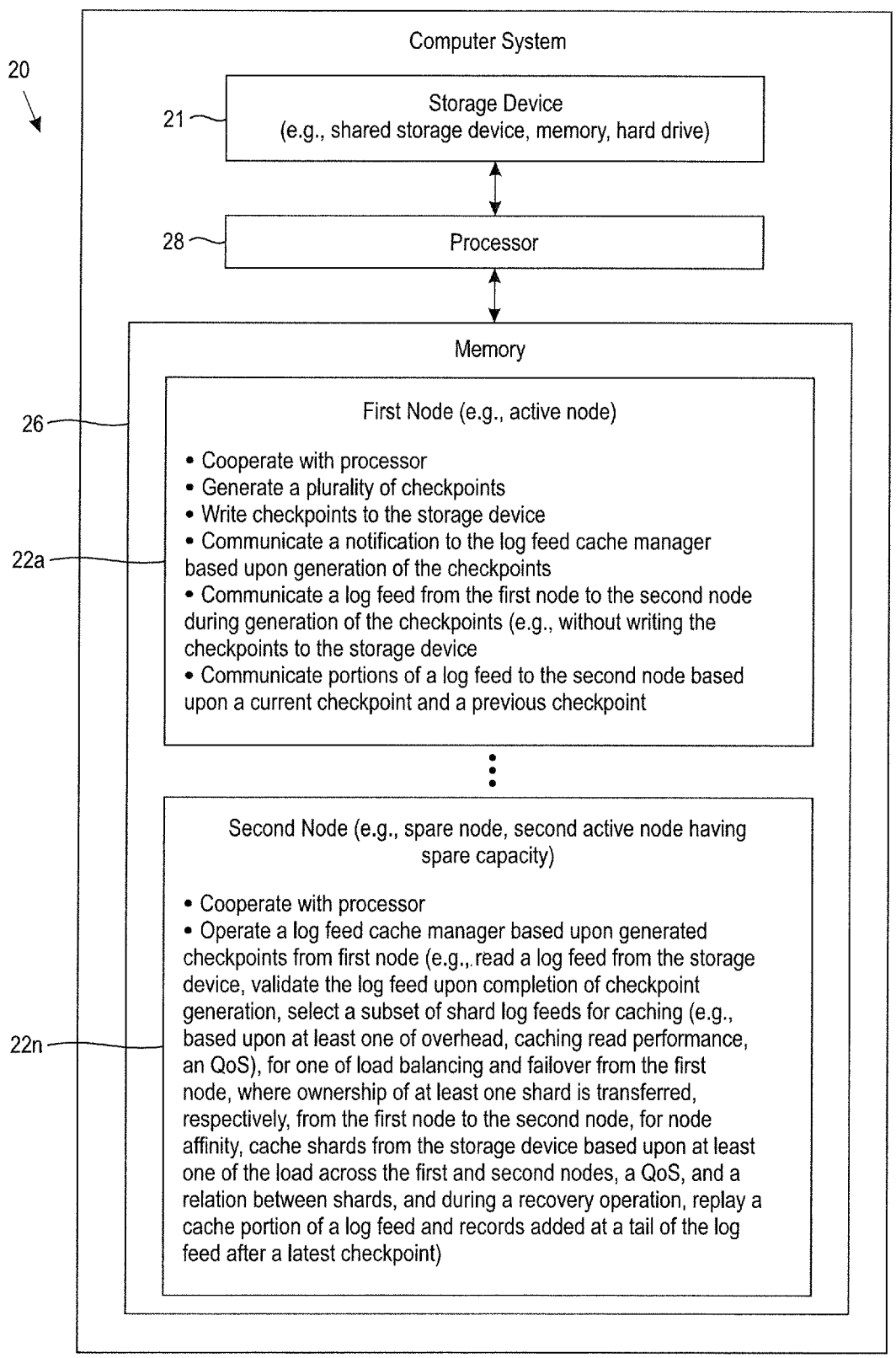
FIG. 1 is a schematic block diagram of a computer system in accordance with an embodiment.
Figure 2:
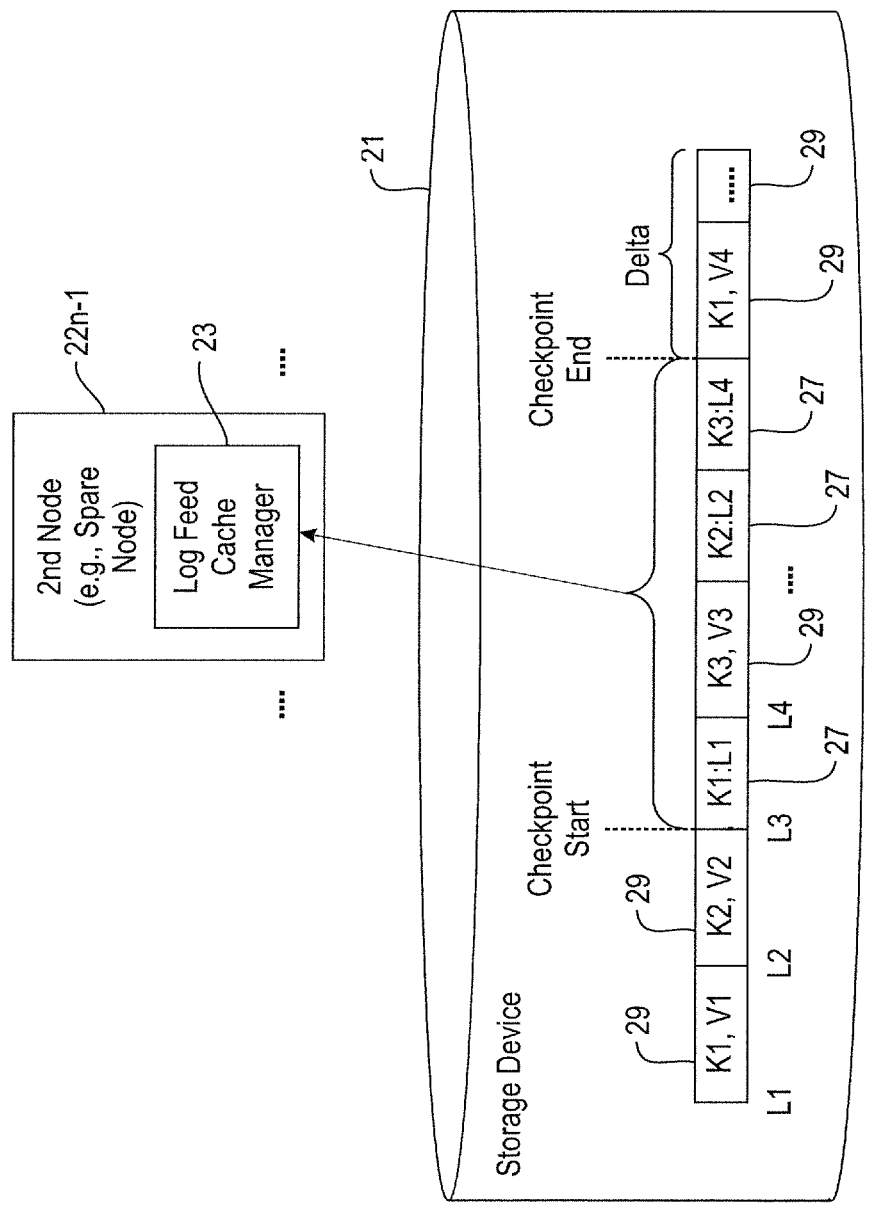
FIG. 2 is a more detailed schematic diagram of the storage device and a second node of the computer system of FIG. 1.
Figure 3:
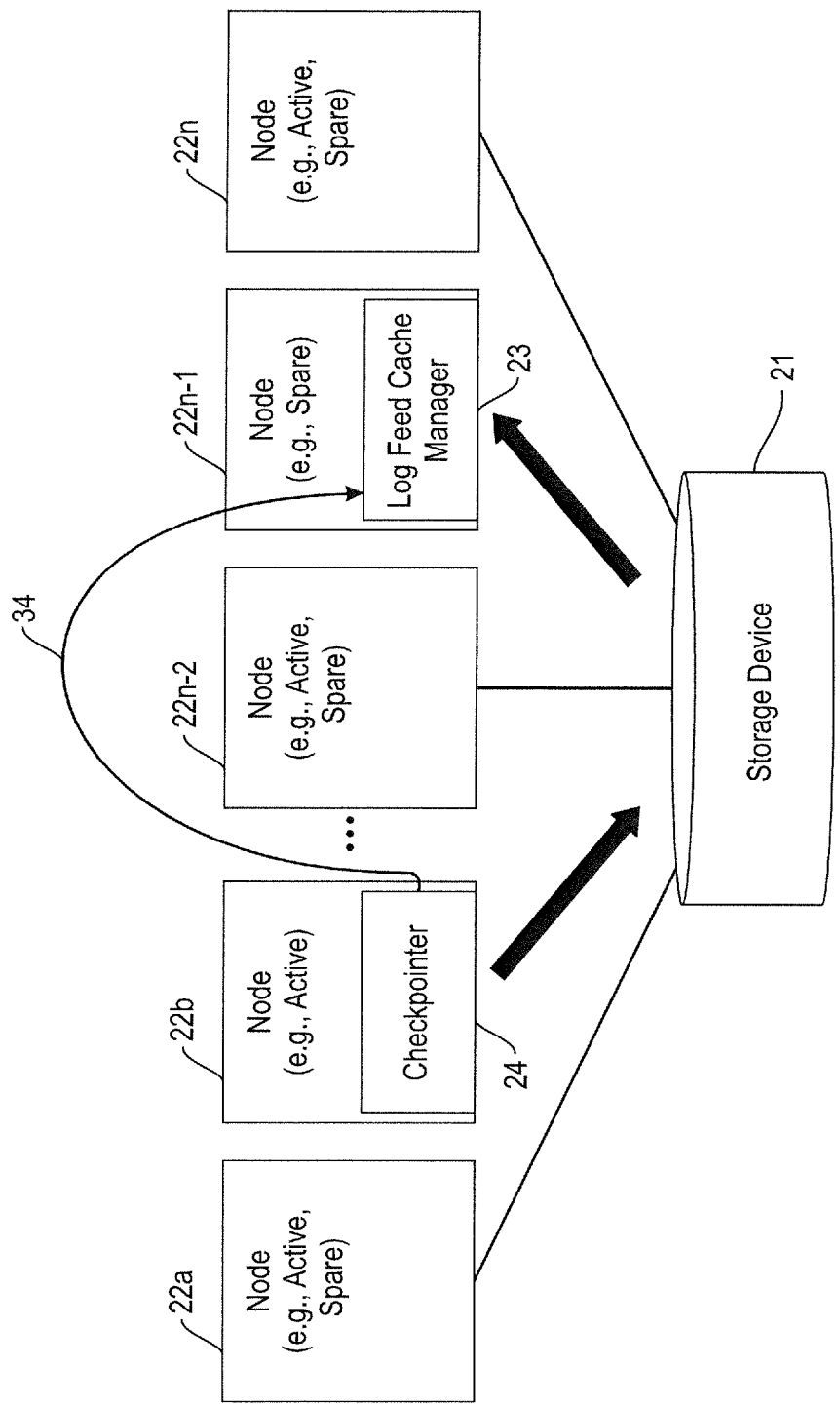
FIG. 3 is a more detailed schematic diagram of the storage device and nodes of the computer system of FIG. 1.

Referring initially to FIGS. 1-3, a computer system 20 includes a storage device 21 (e.g., a shared storage device) and nodes 22a-22n (e.g., of a memory 26) cooperating therewith to define a key value database architecture. The storage device 21 may be a persistent storage device, for example, a hard drive, memory, or other storage device. The storage device 21 may be embodied in one or more than one physical device. For example, the storage device 21 may include several physical storage devices which may be physically separated. The computer system 20 also includes a processor 28 coupled to the storage device 21 and nodes 22a-22n. The processor 28 may be a physical processor, a controller, and/or other circuitry configured to perform operations described herein. Data, which is stored in the memory 26, is persisted as a "log" and is indexed for faster access, for example, where the index={key: offset on the storage device 21}.

A first node 22b, for example, an active node, of the plurality thereof operates a checkpointer 24 that generates checkpoints or checkpoint records 27, for example, that may include a log feed. As will be appreciated by those skilled in the art, an active node may serve input/output (I/O) requests for assigned shards, which are a set of {key: value} pairs and may be considered data records 29. The first node 22b writes, for example, periodically, the checkpoints to the storage device 21. In other words, the portion of the log feed generated during the checkpointing operation is cached, for example, in a second node 22n-1 of the plurality thereof, the cached copy of which is updated periodically. The cached portion of the log feed may include checkpoint records and data records written during the checkpointing process. While operations or functions of the nodes 22a-22n are described herein, it should be appreciated that these operations or functions are executed based upon cooperation with the processor 28.

The second node 22n-1, for example, which may be a spare node operates a log feed cache manager 23, for example, based upon the checkpoints generated by the first node 22b. As will be appreciated by those skilled in the art, a spare node may become active upon a failover, and indexes are regenerated from the storage device 21 by replaying the "log." The first node 22b communicates a notification 34 to the log feed cache manager 23 based upon the checkpoints. In other words, the log feed cache manager 23 is notified of a checkpoint generation. The log feed cache manager 23 reads the log feed from the storage device 21. During a recovery operation, for example, the cached copy of the log feed is replayed in-place and the delta is replayed from the storage device 21. More particularly, for recovery, only the tail of the log feed from the beginning of the latest cached checkpoint may be replayed (which includes the cached log feed+any records added after the checkpoint). In case the active node fails after taking a checkpoint, but before notifying the spare node, the spare node reads the log feed through the latest checkpoint, which it was not notified about, to the end of the log feed. It should be noted that where the log feed is read from the storage device 21, if the log feed cache manager 23 gets notified about a new checkpoint while reading the log feed from the previous checkpoint, it skips to the beginning of the latest checkpoint and start reading the log feed.

Figure 4:
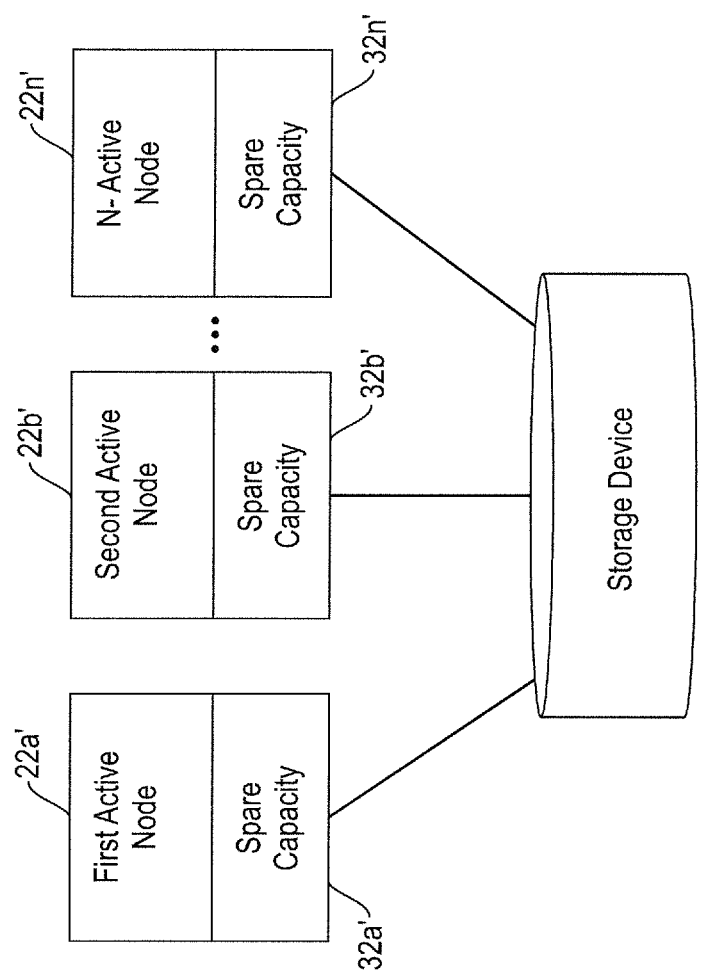
FIG. 4 is a schematic diagram of a storage device and nodes according to another embodiment.

Referring briefly to FIG. 4, instead of the first and second nodes being active and spare nodes, respectively, a first node may be a first active node 22a' having spare capacity 32a', and the second node may be a second active node 22b' having spare capacity 32b'. Additional active nodes 22n' may have spare capacity 32n'. In other words, the functions described above with respect to the functions of the second node may be performed from space capacity in an active node.

Figure 5:
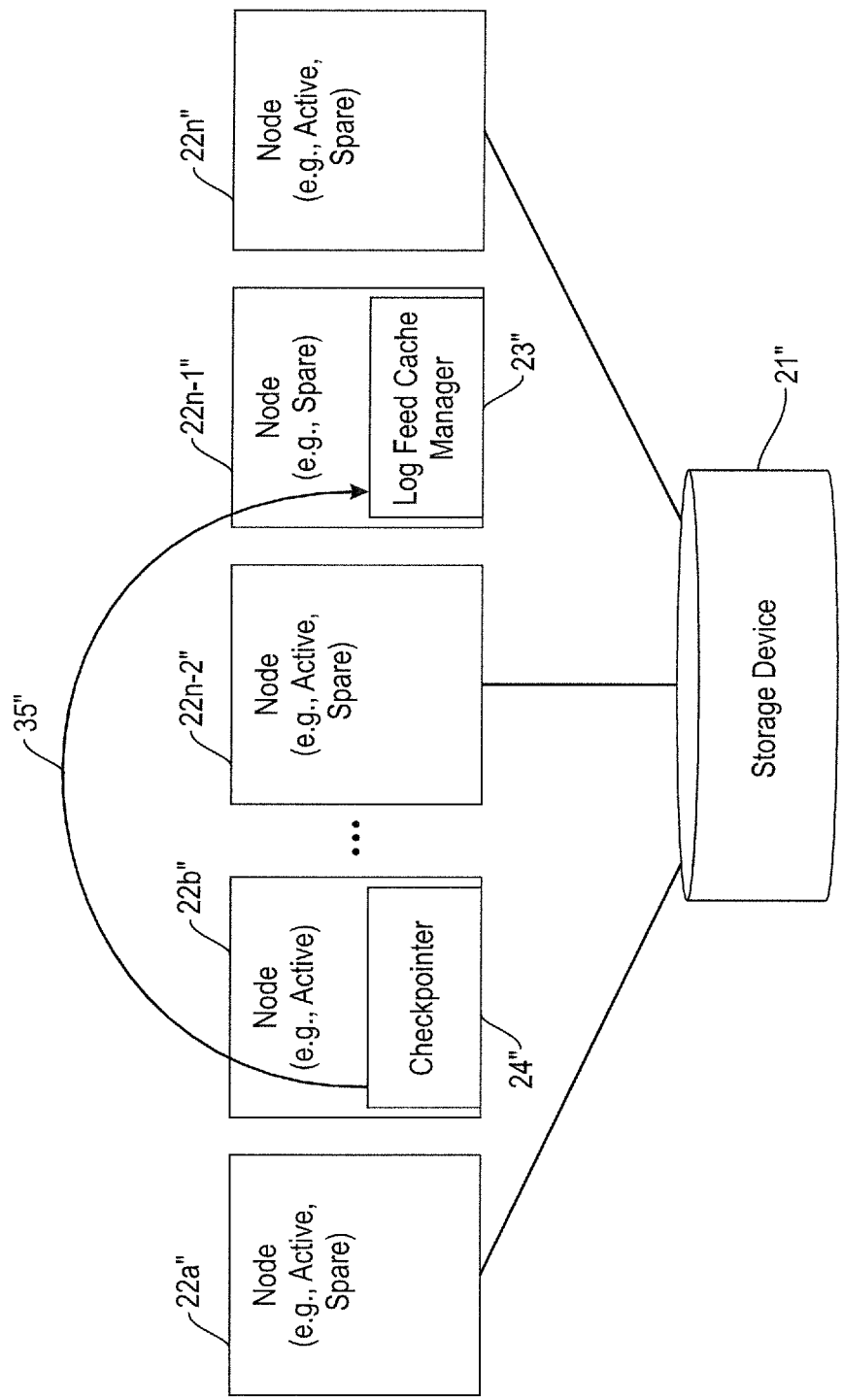
FIG. 5 is a schematic diagram of a storage device and nodes according to another embodiment.

Referring now to FIG. 5, in another embodiment, the first node 22b" communicates a log feed 35" from the first node to the second node 22n-1" during generation of the checkpoints. The second node 22n-1" validates, e.g., declares valid, the log feed 35" based upon completion of generation of the checkpoints. The first node 22b" communicates the log feed without writing the checkpoints to the storage device 21".

Figure 6:
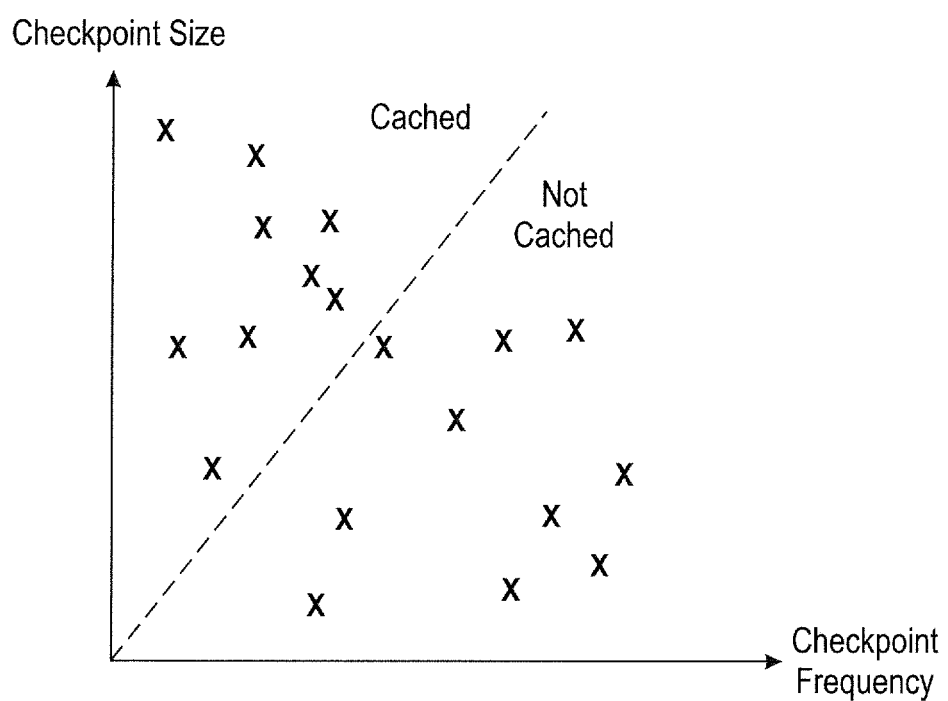
FIG. 6 is a graph illustrating selection of shards according to an embodiment.

Referring again to FIGS. 1-3 and also now to FIG. 6, selection of shards (i.e., a chunk of key value pairs on the storage device 21), will now be described. As will be appreciated by those skilled in the art, all shard log feeds cannot generally be cached, for example, because of limited memory and/or excessive overhead of updating the cache. Accordingly, in some embodiments, the log feed cache manager 23 may select a subset of shard log feeds for caching. The log feed cache manager 23 may select the subset of shard log feeds based upon at least one of overhead, caching read performance, and a quality of service (QoS). With respect to overhead, shards with a relatively high size based upon the frequency of the periodic updating may be selected for caching. With respect to caching read performance, read operations on a per shard basis may be tracked. Shards that are likely to be accessed during a recovery operations may thus be cached. With respect to QoS, recovery time generally determines the degree of disruption, for example, a longer recovery time, the longer a user or process is disrupted. A given application may have a relatively high desired QoS or QoS guarantee associated therewith. Accordingly, a shard that belongs to a relatively high QoS application may be cached, for example, ahead of other applications with lower QoS guarantees.

Shard migration occurs when a responsibility of management of a given shard is handed over from one node to another, for example, between active nodes. The index is reconstructed into the new node. It may be desirable to reduce the overhead of migration time for the migration of a relatively large number of shards, for example, for load balancing and power savings (e.g. by consolidating shards to fewer nodes). To reduce overhead and migration time, in some embodiments, another node of the plurality thereof may be an active node and may generate checkpoints. The log feed cache manager 23 operates based upon the newly generated checkpoints. In other words, the log feeds are cached on another pre-selected active node (i.e., a second active node). During migration all operations on the shard are paused, and the cached log feed and delta (i.e., changes) is replayed on the new host. However, for shard migration operations, for any given shard, log feed caching of two nodes is involved (e.g., active/active).

Another aspect relies upon the affinity of shards from active nodes to specific spare nodes for recovery. To address co-location, QoS, and load balancing through a failure, for example, the log feed cache manager 23 may cache shards from the storage device 21 based upon at least one of a load across the first and second nodes 22b, 22n-1, a quality of service (QoS), and a relation between shards. Since related shards cannot typically be dispersed for a computer system that cannot support multi-node transactions, active and spare nodes may be mapped based upon an N:1 mapping. To maintain a desired QoS threshold during a failure, the nodes 22a-22n may be divided into different classes based on the level of QoS threshold. Shards may be recovered only on the spare nodes belonging to the same class as their active nodes. To further balance loads, the resource usage of each node 22a-22n and input/output operations on each shard may be tracked. The shards are cached to balance the load across nodes 22a-22n.

Figure 7:
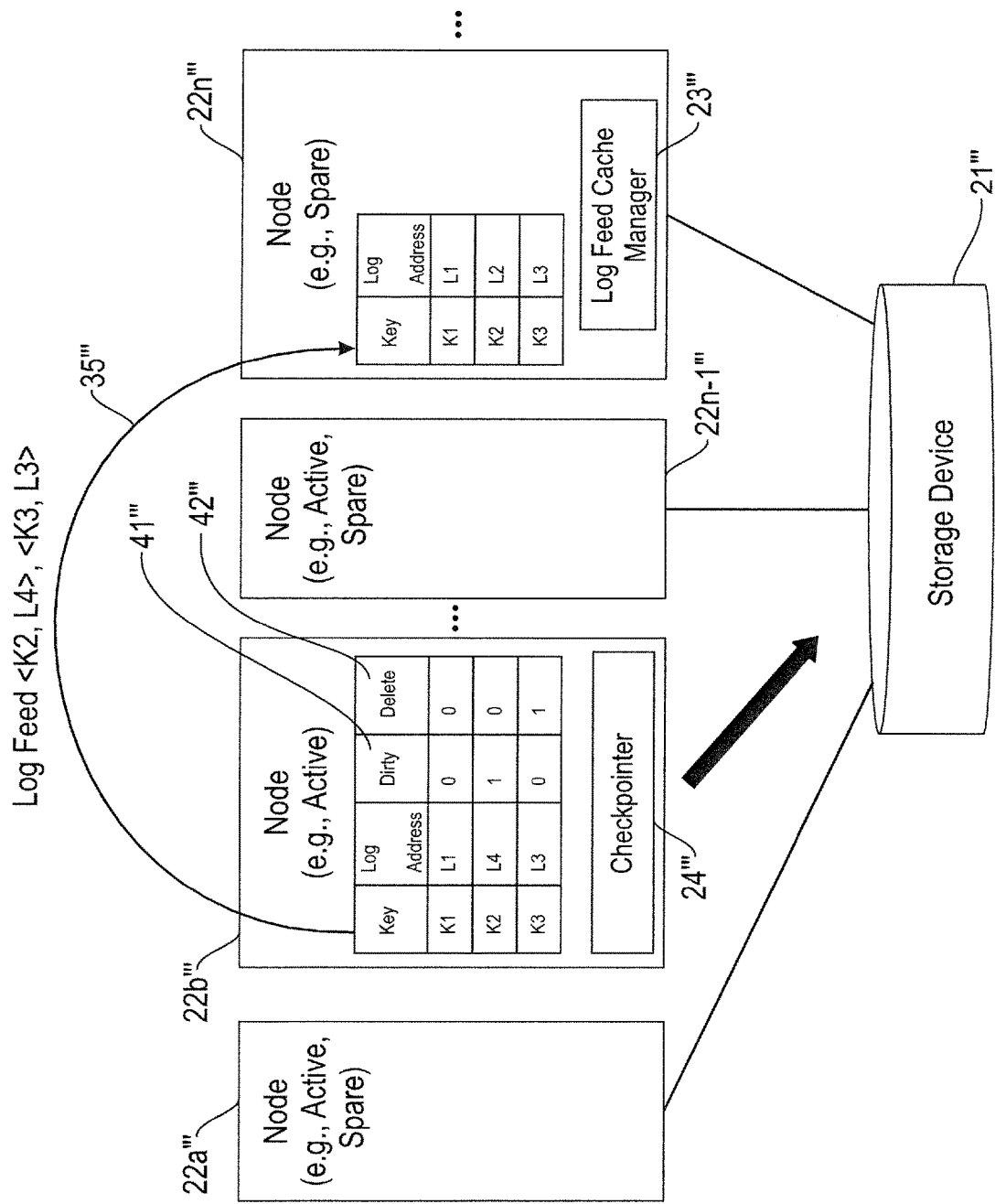
FIG. 7 is a schematic diagram of a storage device and nodes according to another embodiment.

Referring now to FIG. 7, in some embodiments, differential compression may be used to update log feeds 35'''. A new checkpoint includes entries from an old checkpoint and also any modifications. Thus, it may be desirable to reduce the amount of data transferred for updating the cached log feed 35'''. Accordingly, the first node 22b''' communicates portions of the log feed from the first node 22b''' to the second node 22n''' based upon a current checkpoint and a previous checkpoint generated by the first node (e.g., the portion of the log feed transferred is the difference between the current and previous indexes of a shard). This may be done by tracking the changes to the indexes. A dirty bit 41''', for example, may be used to indicate whether there were any modifications since the previous or last checkpoint. A delete bit 42''' may be used to indicate deleted entries.

More particularly, in this approach, dirty and delete bits are used for each key value pair index to track the difference between the new and the old checkpoints. The dirty bits track any modification to the specific key since the last checkpoint, whereas the delete bits track any deleted key value pairs since the last checkpoint. On the active node, e.g., the first node 22b''', the checkpointing process checkpoints the index entries to the storage device 21'''. Moreover, any write and delete operations occurring during the checkpointing are written to the storage device 21''' and also transferred to the spare node, e.g. the second node 22n''. At the end of the checkpointing process, both the bitmap are read, the dirty bitmap is reset, whereas the deleted index entries are removed. The read copy of the bitmap is used to transfer the modified and deleted index entries to the spare node 22n'''. Once the transfer of all the modified and deleted index entries is complete, the checkpoint on the spare node 22n''' is marked valid and can be used for recovery.

As will be appreciated by those skilled in the art, the computer system 20 may provide increased efficiency, for example, in terms of speed, of a fail-over. As described above, a key-value database use indexes to quickly locate the requested key-value pair on a storage device and speed up the execution of queries. Without indexes all the records of the key-value database are scanned on the storage device 21 to find the value corresponding to the requested key. An index includes, for example, a mapping from a key to the location of the corresponding value on the storage device 21, and are arranged in data structures that are relatively easy to traverse for quick lookup, such as, for example, a B-tree. To reduce the index lookup time, a key-value database often keeps the index data structures in memory, whereas the values are brought into the memory from the storage device 21 upon requesting.

In a log-structured key value store, new writes (i.e., insert, update and delete operations) result in a new record being added to an end of the on-disk "log". One approach to reconstruct the state of the index (and state of the system) at the time of a failure or shutdown is to replay the aforementioned log and reconstruct the necessary in-memory data structures. The "log" grows with time. To avoid replaying the log from the beginning each time, the system performs "checkpoint" operations, which record the index operations on disk periodically. A checkpoint is a sequence of index entries and data entries interleaved. The index entries include a key and an offset of the corresponding data on the storage device. When checkpointing a shard, for example, the pre-existing data entries are represented by their indexes in the checkpoint, whereas any ongoing write/update operations are represented as data records. Upon restart after a failure or shutdown, the state of the system can be reconstructed by replaying the log beginning at the last successfully completed checkpoint until the end of the log.

In a shared storage multi-node architecture, the indexes are spread across the available nodes for load balancing. Also additional idle nodes are reserved in advance as spares to provide reliability against a node failure. Upon a failure, for example, of an active node, the spare node replaces the failed active node and serves the I/O requests. To become an active node, the spare node constructs indexes previously residing on the failed node by reading data from storage and then reconstructing the in-memory index. The time consumed in preparing the spare node for serving requests determines the duration of recovery. To speed up the fail-over, the key-value databases also create periodic checkpoints of each database shard, which is a chunk of key value pairs on the storage. The checkpoints reflect the current state of the shard. Upon a failure of a node, the checkpoints of all the shards from the failed node can be replayed on the spare nodes to reconstruct the indexes. However, the size of the checkpoints ranges from tens to hundreds of gigabytes per node depending upon the key size and the amount of data (i.e., number of key-value entries). The retrieval of large checkpoints during recovery can delay the recovery and consume the useful storage bandwidth, thus adversely impacting the performance of the storage device. Moreover, the newly activated node cannot serve I/O requests from the clients until the checkpoints and any following modifications to the log have been replayed from the storage, which adversely impacts the performance of the I/O operations. Accordingly, the computer system 20 described above may provide increased efficiencies during a fail-over by providing mechanisms for relatively fast recovery and migration of shards.

Additionally, while the system 20 has been described with respect to a number of nodes, it will be appreciated that there may be any number of nodes. For example, there may be several active nodes (set A) that can generate checkpoints and there may be several nodes (set B) that be used to cache checkpoints. Set A and set B may be overlapping or mutually exclusive. Still further, while several exemplary storage technologies have been described, it should be noted that the embodiments described herein are applicable to other storage technologies, for example, 3D cross point (3DXP), non-volatile memory express (NVMe), solid-state drive (SSD), or the use of other data transfer techniques for the transfer of the log feed, such as, for example, Remote Direct Memory Access (RDMA).

Figure 8:
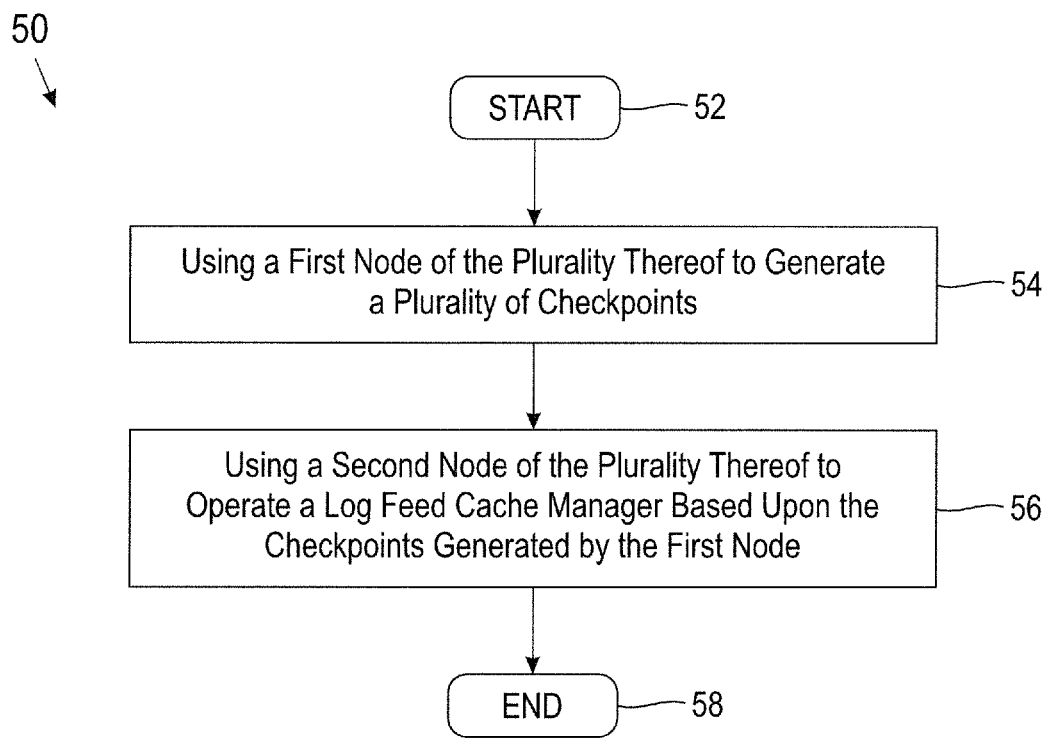
FIG. 8 is a flowchart illustrating a method of operating a computer system in accordance with an embodiment.

Referring now to the flowchart 50 in FIG. 8, beginning at Block 52, a computer-implemented method aspect is for operating a computer system 20 that includes a storage device 21 and a plurality of nodes 22a-22n cooperating therewith to define a key value database architecture. The method includes, at Block 54, using a first node 22b of the plurality thereof to generate a plurality of checkpoints, and, at Block 56, using a second node 22n-1 of the plurality thereof to operate a log feed cache manager 23 based upon the checkpoints generated by the first node. The method ends at Block 58.

Another aspect is directed to a computer program product for operating a computer system 20 that includes a computer readable storage medium having computer executable instructions thereon for causing a processor 28 to perform operations. The operations include using a first node 22b of a plurality thereof 22a-22n of the computer system to generate a plurality of checkpoints, the plurality of nodes cooperating with a storage device to define a key value database, and using a second node 22n-1 of the plurality thereof to operate a log feed cache manager 23 based upon the checkpoints generated by the first node.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While several embodiments have been described herein, it will be appreciated that elements from any given embodiment may be used with any one or more elements from any one or more of other embodiments described herein. Moreover, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a memory including a plurality of nodes;
a storage device;
a processor coupled to the memory and the storage device to define a key value database architecture;
a first node of the plurality thereof configured to generate a plurality of checkpoints, each checkpoint including a plurality of checkpoint records that track indexes of the key value database architecture, each index including a mapping from a key to a location of a corresponding value on the storage device; and
a second node of the plurality thereof including spare node memory, the second node configured to operate a log feed cache manager to cache one or more portions of a log feed in the spare node memory, each portion including at least the checkpoint records of one of the checkpoints generated by the first node.

2. The computer system of claim 1 wherein the first node is configured to write the plurality of checkpoints to the storage device.

3. The computer system of claim 1 wherein the first node is configured to communicate a notification to the log feed cache manager based upon generation of the plurality of checkpoints.

4. The computer system of claim 1 wherein the log feed cache manager is configured to read the log feed from the storage device.

5. The computer system of claim 1 wherein the first node is configured to communicate the log feed from the first node to the second node during generation of the plurality of checkpoints.

6. The computer system of claim 5 wherein the second node is configured to validate the log feed based upon completion of generation of the plurality of checkpoints.

7. The computer system of claim 5 wherein the first node is configured to communicate the log feed without writing the plurality of checkpoints to the storage device.

8. The computer system of claim 1 wherein the first node is configured to communicate portions of the log feed from the first node to the second node based upon a current checkpoint and a previous checkpoint generated by the first node.

9. The computer system of claim 1 wherein the first node comprises an active node, and the second node comprises a spare node.

10. The computer system of claim 1 wherein the first node comprises a first active node; and wherein the second node comprises a second active node having spare capacity.

11. The computer system of claim 1 wherein the log feed cache manager is configured to select a subset of shard log feeds for caching.

12. The computer system of claim 11 wherein the log feed cache manager is configured to select the subset of shard log feeds based upon at least one of overhead, caching read performance, and a quality of service (QoS).

13. The computer system of claim 1 wherein a respective one of the first and second nodes is configured, for one of load balancing and failover from the first node, where ownership of at least one shard is transferred, respectively, from the first node to the second node.

14. The computer system of claim 1 wherein the log feed cache manager is configured to, for node affinity, cache shards from the storage device based upon at least one of a load across the first and second nodes, a quality of service (QoS), and a relation between shards.

15. The computer system of claim 1, wherein, during a recovery operation, the log feed cache manager is configured to replay at least one of the cached portions of the log feed and records added at a tail of the log feed after a latest checkpoint.

16. A computer-implemented method for operating a computer system comprising a storage device, a memory including a plurality of nodes, and a processor coupled to the memory and the storage device to define a key value database architecture, the method comprising:
  using a first node of the plurality thereof to generate a plurality of checkpoints, each checkpoint including a plurality of checkpoint records that tracks indexes of the key value database architecture, each index including a mapping from a key to a location of a corresponding value on the storage device;
  operating, using a second node of the plurality thereof including spare node memory a log feed cache manager; and
  caching, via the log feed cache manager, one or more portions of a log feed in the spare node memory, each portion including at least the checkpoint records of one of the checkpoints generated by the first node.

17. The computer-implemented method of claim 16 wherein the first node is used to write the plurality of checkpoints to the storage device.

18. The computer-implemented method of claim 16 wherein the first node is used to communicate a notification to the log feed cache manager based upon generation of the plurality of checkpoints.

19. A computer program product for operating a computer system comprising a computer readable storage medium having computer executable instructions thereon for causing a processor to perform operations comprising:
  using a first node of a plurality thereof of the computer system to generate a plurality of checkpoints, wherein:
    the plurality of nodes cooperate with a storage device to define a key value database;
    each checkpoint includes a plurality of checkpoint records to track indexes of the key value database architecture, each index including a mapping from a key to a location of a corresponding value on the storage device;
  operating, using a second node of the plurality thereof including spare node memory a log feed cache manager; and
  caching, via the log feed manager, one or more portions of a log feed in the spare node memory, each portion including at least the checkpoint records of one of the checkpoints generated by the first node.

20. The computer program product of claim 19 wherein the computer executable instructions cause the first node to write the plurality of checkpoints to the storage device.

* * * * *